United States Patent Office

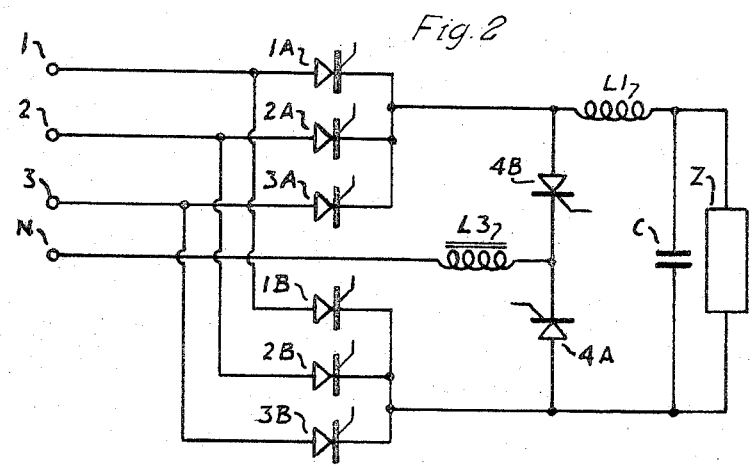
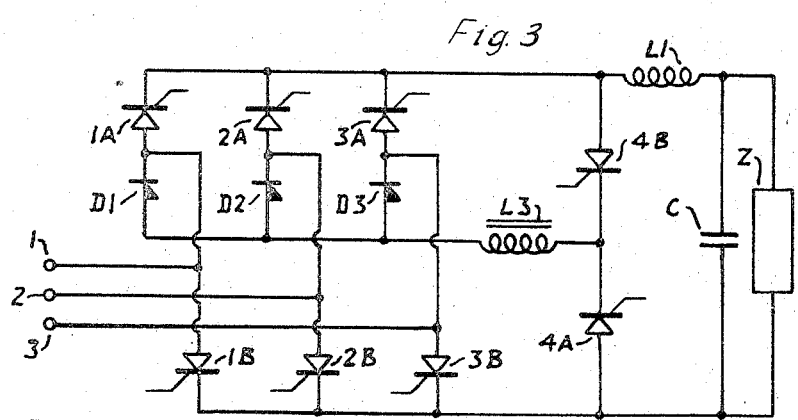
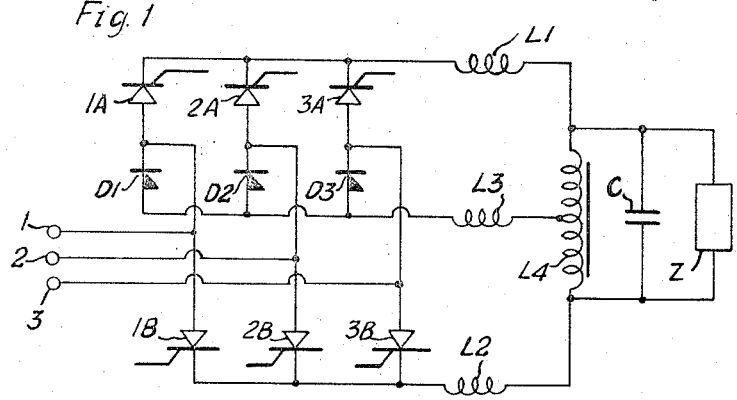

3,337,788
Patented Aug. 22, 1967

3,337,788
CYCLO-CONVERTER CIRCUITS
Brian Raymond Pelly, London, England, assignor to Westinghouse Brake and Signal Company, Limited, London, England
Filed July 2, 1964, Ser. No. 379,849
Claims priority, application Great Britain, July 5, 1963, 26,733/63; Feb. 27, 1964, 8,175/64
5 Claims. (Cl. 321—7)

This invention relates to cyclo-converter circuits.

According to the present invention there is provided a cyclo-converter circuit for converting an alternating current supply of one frequency into an alternating current supply of another frequency comprising for each phase of the supply a controllable full-wave switching arrangement for switching sections of half cycles of the supply wave-forms alternately in opposite directions to an output circuit.

In order that the invention may be clearly understood and readily carried into effect, the same will now be further described by way of example only with reference to FIGURES 1, 2 and 3 of the accompanying drawings which illustrate various embodiments of the invention.

Referring to FIGURE 1, terminals 1, 2 and 3 are respective input terminals for the three phases of a three-phase alternating current supply. The terminal 1 is connected by a controllable rectifier device 1A and an inductance L1 to one terminal of a choke L4 across which the output of the circuit is derived. The terminal 1 is also connected by a further semi-conductor rectifier device 1B and a further choke L2 to the other terminal of L4. Similar arrangements of controllable rectifier devices 2A, 2B and 3A and 3B are respectively provided for the phases which are fed to terminals 2 and 3. A centre tapping of the choke L4 is connected via a further choke L3 and respective diodes D1, D2 and D3 to terminals 1, 2 and 3 as shown. These diodes provide the return path for the phases when switched to the alternate halves of the choke L4. The load represented by Z is connected in parallel with a commutating capacitor C across the choke L4.

In operation of the circuit arrangement shown in FIG. 1, it will be first understood that the controllable rectifier devices 1A, 1B, 2A, 2B, 3A and 3B are semi-conductor devices of a type which are rendered conducting on application of a triggering signal thereto and are subsequently rendered non-conducting when the current therein tends to reverse. When the input terminal 1, for example, is more positive than either of terminals 2 and 3, and if at the same time controllable rectifier device 1A is assumed to be conducting, devices 2A and 3A are clearly biassed into the non-conducting condition. Similarly, when 1B is conducting in a similar way to 1A, as aforementioned, devices 2B and 3B are biassed into the non-conducting condition. Similar statements are true regarding the conduction of 2A, 2B, 3A and 3B. The circuit operates by switching current of the supply wave-forms at 1, 2 and 3 alternately to opposite ends of the choke L4 so as to increase the effective frequency of the output as compared with that of the input. Hence, considering a period when 1 is more positive than 2 or 3, devices 1A and 1B are alternately rendered conducting to supply current from the terminal 1 via the upper or lower halves, as the case may be, of the choke L4. Similarly, when the terminal 1 is more negative than either of terminals 2 or 3, diode D1 tends to conduct and diodes D2 and D3 are biassed into their non-conducting condition. In this case, controllable rectifiers 2A and 2B (or alternatively 3A and 3B) are rendered conducting alternately to supply current through the upper or lower halves of L4 similarly to the above. Hence, it will be appreciated that, from the point of view of the phase supplied to terminal 1, each half cycle of this phase is employed to supply current to the load. The operation when the phases at terminals 2 and 3 are predominant is similar to that described with reference to the phase at terminal 1 and requires no further description.

It will be appreciated that by alternately rendering controllable rectifier devices conducting during half cycles of the phases applied thereto, it is possible to develop across the output circuit a supply of substantially greater frequency than the input three-phase frequency. Further, it will be appreciated that high frequency commutation from one controllable rectifier to the other in each pair, is achieved by arranging the component values of the circuit components in relation to the triggering frequency for the controllable rectifier devices such that at the instant of rendering either controllable rectifier device in each pair conducting, the voltage across the capacitor C is of such a polarity as to render the other controllable rectifier device non-conducting. The principle of the commutating capacitor is well known in the art and would appear to require no further discussion herein.

Referring to FIG. 2, the terminals 1, 2 and 3 are terminals for connection to a three-phase supply for the circuit similarly to the circuit described above except that a terminal N is provided as a neutral supply terminal. Terminals 1, 2 and 3 are connected on the one hand via controllable rectifier devices 1A, 2A and 3A via a small peak current limiting inductance L1 to an output circuit formed of a capacitor C and an inductance load Z. On the other hand, terminals 1, 2 and 3 are connected via respective controllable rectifier devices 1B, 2B and 3B to the other terminal of the output circuit formed by C and Z. The junction of 1A, 2A and 3A is connected via a further controllable rectifier device 4B to an inductance L3 the other terminal of which is connected to the neutral supply line N. Similarly, the common junction of controllable rectifier devices 1B, 2B and 3B is connected via a further controllable rectifier device 4A also to the junction of L3 and 4B.

In operation of this circuit arrangement, it is again assumed that the frequency to be supplied to the inductive load Z is substantially higher than the frequency of the three-phase supply and the combination of C and Z has a resonant frequency slightly lower than the desired output frequency. The controllable rectifier devices 1A, 2A, 3A, 1B, 2B and 3B, moreover, are devices of a type which is rendered conducting on application of a triggering signal thereto and is subsequently rendered non-conducting when the current therein falls below a sustaining value. During intervals when the supply terminal 1 is more positive than either of the supply terminals 2 and 3, the controllable rectifier device 1A and the controllable rectifier device 4A are each triggered into the conducting condition intermittently with the controllable rectifier device 1B and the controllable rectifier device 4B. Under these conditions it will be appreciated that the supply to the inductance Z is an alternating current supply of a frequency equal to the repetition rate of the switching between the aforementioned pairs of devices. Further, at the end of a swing of the voltage across Z on say the rendering of 1A and 4A conducting, the lower plate of the capacitor C is at a negative value and therefore when 4B and 1B are subsequently rendered conducting, the negative voltage is applied to the controllable rectifier device 4A which thereby renders it non-conducting. This is similarly true of the device 1A. Hence automatic commutation of the controllable rectifier devices is provided. A similar mode of operation occurs when the terminal 2 or the terminal 3 becomes more positive than either of the other two supply terminals.

Referring to FIG. 3, in this circuit arrangement, there is no neutral supply line and the return path for current is taken through respective diodes D1, D2 and D3 to the respective supply phase terminals 1, 2 and 3. The mode of operation of the arrangement of FIG. 3 is substantially similar to that of FIG. 1 except that the arrangement is operable for the negative half-cycles of the supply as well as for positive half-cycles.

Although the triggering circuits for the controllable rectifier devices in the above described circuits have not been described herein, such triggering circuits are now well established in the art and the mode of construction of a suitable triggering circuit for operating the controllable rectifier devices according to the desired sequence of operations will be readily apparent to a skilled engineer.

It is believed that the cyclo-converter circuit, according to the present invention, has advantages over certain previously proposed cyclo-converter circuits in that the low frequency ripple voltage at the output of the converter circuit may be considerably reduced and in the circuits which operate on both half-cycles of the supply is twice the frequency that would otherwise be the case. Again, the power factor imposed on the input supply may be improved and the direct current component of current in the input supply lines may be eliminated. This latter feature means that a zig-zag connected supply transformer is not required.

Although the embodiment of the invention, described herein, specifically employs semi-conductor controllable rectifier devices, other types of devices having similar characteristics may be employed in the controllable full-wave switching arrangement without departing from the spirit of the invention.

Having thus described my invention what I claim is:

1. A cyclo-converter circuit for converting a multi-phase alternating current supply of one frequency into an alternating current supply of another frequency, comprising a plurality of input terminals adapted for connection with the terminals of the alternating current supply, respectively;

a pair of output terminals adapted for connection with a load;

first and second sets of controllable unilaterally conductive switching devices each having first and second power circuit electrodes and a control electrode, the first power circuit electrodes of said first set of switching devices being connected with one output terminal and the first power circuit electrodes of said second set of switching devices being connected with the other output terminal, the second power circuit electrodes of each of said first and second sets being connected with said input terminals, respectively;

a pair of additional controllable unilaterally conductive switching devices having power circuit electrodes connected in series opposition across said output terminals, said additional switching devices also including control electrodes, and a plurality of further unilaterally conductive devices like ends of each of which are connected with the junction between said pair of additional switching devices, the other ends of said further devices being connected with the second power circuit electrodes of each of said first and second sets of switching devices, respectively, said devices being so connected as to constitute a controllable full-wave switching arrangement for each phase of the supply wave-form.

2. A cyclo-converter circuit for converting a multi-phase alternating current supply of one frequency into an alternating current supply of another frequency, comprising input terminal means adapted for connection with the phase terminals of the alternating current supply, respectively;

a pair of output terminals adapted for connection with a load;

first and second sets of controllable unilaterally conductive switching devices each having first and second power circuit electrodes and a control electrode, the first power circuit electrodes of said first set of switching devices being connected with one output terminal and the first power circuit electrodes of said second set of switching devices being connected with the other output terminal, the second power circuit electrodes of each of said first and second sets being connected with said input terminals, respectively;

a pair of additional controllable unilaterally conductive switching devices having power circuit electrodes connected in series opposition across said output terminals, said additional switching devices also including control electrodes;

and means including an inductance (L3) connecting the junction between said additional switching devices with said input terminal means, said devices being so constructed as to constitute a controllable full-wave switching arrangement for each phase of the supply wave-form.

3. Apparatus as defined in claim 2, wherein said inductance is connected at one end with said junction, said means for connecting said junction with said input terminal means comprising a plurality of further unilaterally conductive devices like ends of each of which are connected with the other end of the said inductance, the other ends of said further devices being connected with the second power circuit electrodes of each said first and second sets of switching devices, respectively.

4. Apparatus as defined in claim 2, wherein the alternating current supply includes a neutral connection and the input means includes a neutral input terminal adapted for connection with said neutral connection, said inductance being connected at one end with said junction and at the other end with said neutral input terminal.

5. Apparatus as defined in claim 2, and further including a commutating capacitor connected across said output terminals, and a further series-connected inductance (L1) connecting one of said output terminals with the said first set of switching devices and said pair of additional switching devices.

References Cited
UNITED STATES PATENTS 2,280,749    4/1942    Clark _____ 321—66
2,911,581   11/1959    Rockafellow _____ 321—7

JOHN F. COUCH, *Primary Examiner.*

G. GOLDBERG, *Assistant Examiner.*